(12) United States Patent
Loeb et al.

(10) Patent No.: US 7,658,119 B2
(45) Date of Patent: Feb. 9, 2010

(54) BIOMIMETIC TACTILE SENSOR

(75) Inventors: Gerald E. Loeb, South Pasadena, CA (US); Roland Johansson, Umeå (SE)

(73) Assignee: University of Southern California, Los Angeles, CA (US)

( * ) Notice: Subject to any disclaimer, the term of this patent is extended or adjusted under 35 U.S.C. 154(b) by 121 days.

(21) Appl. No.: 11/692,718

(22) Filed: Mar. 28, 2007

(65) Prior Publication Data

US 2007/0227267 A1    Oct. 4, 2007

Related U.S. Application Data

(60) Provisional application No. 60/786,607, filed on Mar. 28, 2006.

(51) Int. Cl.
*G01D 7/00* (2006.01)
*G01L 1/00* (2006.01)

(52) U.S. Cl. .............................. 73/862.046; 73/862.68; 901/33; 901/46

(58) Field of Classification Search ............ 73/862.046, 73/862.68; 901/46, 39, 36, 33; 623/24; 294/99.1; 345/173–174, 156
See application file for complete search history.

(56) References Cited

U.S. PATENT DOCUMENTS

| | | | |
|---|---|---|---|
| 4,306,148 A | 12/1981 | Ringwall et al. |
| 4,481,815 A | 11/1984 | Overton |
| 4,492,949 A | 1/1985 | Peterson et al. |
| 4,521,685 A | 6/1985 | Rebman |
| 4,526,043 A | 7/1985 | Boie |
| 4,555,953 A | 12/1985 | Dario |
| 4,555,954 A | 12/1985 | Kim |
| 4,574,438 A | 3/1986 | Diepers et al. |
| 4,584,625 A | 4/1986 | Kellogg |
| 4,616,511 A | 10/1986 | Gindy et al. |
| 4,621,533 A | 11/1986 | Gindy |
| 4,634,917 A | 1/1987 | Dvorsky et al. |

(Continued)

FOREIGN PATENT DOCUMENTS

EP    1611841 (A1)    1/2006

(Continued)

OTHER PUBLICATIONS

Kenaley et al. "Electrorheological Fluid-Based Robotic Fingers with Tactile Sensing" Robotics and Automation, 1989. Proceedings., 1989 IEEE International Conference on. May 14-19, 1989, pp. 132-136 vol. 1.*

(Continued)

*Primary Examiner*—Lisa M Caputo
*Assistant Examiner*—Jonathan Dunlap
(74) *Attorney, Agent, or Firm*—McDermott Will & Emery LLP

(57) ABSTRACT

Disclosed is a tactile sensory system consisting of set of sensors that work by measuring impedance among plurality of electrodes. The electrodes are deployed on a substantially rigid structure that is protected form the direct contact with external objects by overlying deformable structures. These mechanical structures have similarities to the biological relationships among the distal phalanx, overlying finger pulp and covering skin and nail. Signal information is extracted form these sensors that is related to canonical physical representations used to describe stimuli to be sensed.

12 Claims, 4 Drawing Sheets

U.S. PATENT DOCUMENTS

| | | |
|---|---|---|
| 4,640,137 A | 2/1987 | Trull et al. |
| 4,694,231 A | 9/1987 | Alvite |
| 4,712,037 A | 12/1987 | Verbeek et al. |
| 4,715,235 A | 12/1987 | Fukui |
| 4,745,812 A | 5/1988 | Amazeen et al. |
| 4,747,313 A | 5/1988 | Okada |
| 4,813,732 A | 3/1989 | Klem |
| 4,814,562 A | 3/1989 | Langston |
| 4,817,440 A | 4/1989 | Curtin |
| 4,866,412 A | 9/1989 | Rzepczynski |
| 4,886,361 A | 12/1989 | Furstenau |
| 4,945,305 A | 7/1990 | Blood |
| 4,964,302 A | 10/1990 | Grahn et al. |
| 4,980,646 A | 12/1990 | Zemel |
| 5,010,774 A * | 4/1991 | Kikuo et al. ........... 73/862.046 |
| 5,014,224 A | 5/1991 | Hans |
| 5,033,291 A | 7/1991 | Podoloff |
| 5,060,527 A | 10/1991 | Burgess |
| 5,138,216 A | 8/1992 | Woodruff et al. |
| 5,193,539 A | 3/1993 | Schulman et al. |
| 5,193,540 A | 3/1993 | Schulman et al. |
| 5,200,679 A | 4/1993 | Graham |
| 5,209,126 A | 5/1993 | Grahn |
| 5,225,959 A | 7/1993 | Stearns |
| 5,237,879 A | 8/1993 | Speeter |
| 5,255,345 A | 10/1993 | Shaefer |
| 5,261,266 A | 11/1993 | Lorenz et al. |
| 5,312,439 A | 5/1994 | Loeb |
| 5,313,840 A | 5/1994 | Chen et al. |
| 5,324,316 A | 6/1994 | Schulman et al. |
| 5,373,747 A | 12/1994 | Ogawa et al. |
| 5,405,367 A | 4/1995 | Schulman et al. |
| 5,501,498 A * | 3/1996 | Ulrich .................... 901/36 |
| 5,510,812 A | 4/1996 | O'Mara et al. |
| 5,563,354 A | 10/1996 | Kropp |
| 5,604,314 A | 2/1997 | Grahn |
| 5,744,953 A | 4/1998 | Hansen |
| 5,760,530 A | 6/1998 | Kolesar |
| 5,871,248 A * | 2/1999 | Okogbaa et al. .............. 901/39 |
| 5,886,615 A | 3/1999 | Burgess |
| 5,905,430 A | 5/1999 | Yoshino |
| 5,905,485 A | 5/1999 | Podoloff |
| 5,953,683 A | 9/1999 | Hansen et al. |
| 5,965,880 A | 10/1999 | Wolf et al. |
| 5,983,725 A | 11/1999 | Fischer et al. |
| 6,003,390 A | 12/1999 | Cousy |
| 6,007,728 A | 12/1999 | Liu et al. |
| 6,067,862 A | 5/2000 | Murray et al. |
| 6,154,580 A | 11/2000 | Kuriyama et al. |
| 6,163,739 A | 12/2000 | Park et al. |
| 6,175,764 B1 | 1/2001 | Loeb et al. |
| RE37,065 E | 2/2001 | Grahn |
| 6,188,331 B1 | 2/2001 | Zee et al. |
| 6,231,520 B1 | 5/2001 | Maezawa |
| 6,286,226 B1 | 9/2001 | Jin |
| 6,400,139 B1 | 6/2002 | Khalfin et al. |
| 6,443,509 B1 | 9/2002 | Levin et al. |
| 6,445,284 B1 | 9/2002 | Cruz-Hernandez et al. |
| 6,528,991 B2 | 3/2003 | Ashe |
| 6,529,122 B1 | 3/2003 | Magnussen |
| 6,584,217 B1 | 6/2003 | Lawless et al. |
| 6,593,756 B1 | 7/2003 | Schmidt et al. |
| 6,622,575 B1 | 9/2003 | Nagata |
| 6,624,626 B2 | 9/2003 | Khalfin |
| 6,690,963 B2 | 2/2004 | Ben-Haim et al. |
| 6,769,313 B2 | 8/2004 | Weiss |
| 6,848,320 B2 | 2/2005 | Miyajima et al. |
| 6,871,395 B2 | 3/2005 | Scher |
| 6,886,415 B1 | 5/2005 | Kurogi et al. |
| 6,888,537 B2 | 5/2005 | Benson et al. |
| 6,898,299 B1 | 5/2005 | Brooks |
| 6,915,701 B1 | 7/2005 | Tarler |
| 6,955,094 B1 | 10/2005 | Tarler |
| 6,996,456 B2 | 2/2006 | Cordell et al. |
| 7,004,039 B1 | 2/2006 | Ford |
| 7,006,895 B2 | 2/2006 | Green |
| 7,016,560 B2 | 3/2006 | Ticknor |
| 7,066,376 B2 | 6/2006 | Scher et al. |
| 7,069,791 B2 | 7/2006 | Hashimoto et al. |
| 7,103,447 B2 | 9/2006 | Di Profio et al. |
| 7,107,124 B2 | 9/2006 | Green |
| 7,112,755 B2 | 9/2006 | Kitano et al. |
| 7,198,908 B2 | 4/2007 | Ochi et al. |
| 7,209,028 B2 | 4/2007 | Boronkay et al. |
| 7,324,872 B2 | 1/2008 | Nagasaka |
| 7,347,110 B1 | 3/2008 | Chen et al. |
| 7,357,035 B2 | 4/2008 | Liu et al. |
| 7,361,919 B2 | 4/2008 | Setlak |
| 7,366,332 B2 | 4/2008 | Shimamura et al. |
| 7,367,232 B2 | 5/2008 | Vaganov et al. |
| 7,373,843 B2 | 5/2008 | Ganapathi et al. |
| 2003/0051561 A1 | 3/2003 | Weiss |
| 2004/0187071 A1 | 9/2004 | Zhang et al. |
| 2005/0021154 A1 * | 1/2005 | Brimalm .................... 623/64 |
| 2005/0134562 A1 | 6/2005 | Grant |
| 2005/0234292 A1 | 10/2005 | Faulkner et al. |
| 2005/0239191 A1 | 10/2005 | Prins |
| 2005/0253206 A1 | 11/2005 | Bureau |
| 2006/0010090 A1 | 1/2006 | Brockway |
| 2006/0014912 A1 | 1/2006 | Araki |
| 2006/0115348 A1 | 6/2006 | Kramer |
| 2006/0161225 A1 | 7/2006 | Sormann et al. |
| 2006/0175770 A1 | 8/2006 | Linzell |
| 2007/0060815 A1 | 3/2007 | Martin et al. |
| 2007/0207903 A1 * | 9/2007 | Csabai .................... 482/121 |
| 2007/0227267 A1 | 10/2007 | Loeb et al. |
| 2007/0265515 A1 | 11/2007 | Brister et al. |

FOREIGN PATENT DOCUMENTS

| | | |
|---|---|---|
| EP | 1626331 (A2) | 2/2006 |
| EP | 1633248 (A1) | 3/2006 |
| EP | 1835380 (A1) | 9/2007 |
| EP | 1835552 (A1) | 9/2007 |
| EP | 1901048 (A2) | 3/2008 |
| EP | 1942323 (A1) | 7/2008 |
| WO | WO 2004112609 A1 * | 12/2004 |

OTHER PUBLICATIONS

Russell et al. "Sensing Surface Shape by Touch" Robotics and Automation, 1993. Proceedings., 1993 IEEE International Conference on. May 2-6, 1993, pp. 423-428 vol. 1.*

Son et al. "A Tactile Sensor for Localizing Transient Events in Manipulation" Robotics and Automation, 1994. Proceedings., 1994 IEEE International Conference on. May 8-13, 1994, vol. 1.*

Worth et al. "A Neural Network for Tactile Sensing: The Hertzian Contact Problem" IEEE Transactions on Systems, Man. and Cybernetics, vol. 22, No. 1, Jan./Feb. 1992, pp. 177-182.*

Kageyama et al. "Development of Soft and Distributed Tactile Sensors and the Application to a Humanoid Robot" Systems, Man, and Cybernetics, 1999. IEEE SMC '99 Conference Proceedings. 1999 IEEE International Conference on. 1999, pp. 981-986, vol. 2.*

DML. "Telemanipulation—Dextrous Manipulation Laboratory: Ongoing Research: Tactile Sensing" Mar. 22, 2002. <http://www-cdr.stanford.edu/DML/tele_projects/res_tacsens.htm>.*

Charlton et al. "Extracting Contact Parameters from Tactile Data Using Artificial Neural Networks" Systems, Man and Cybernetics, 1995. Intelligent Systems for the 21st Century., IEEE International Conference on. Oct. 22-25, 1995. pp. 3954-3959. Published Aug. 6, 2002.*

Son et al. "Comparison of Contact Sensor Localization Abilities During Manipulation" Intelligent Robots and Systems 95. 'Human Robot Interaction and Cooperative Robots', Proceedings. 1995 IEEE/RSJ International Conference on. Aug. 5-9, 1995. pp. 96-103 vol. 2. Published Aug. 6, 2002.*

International Search Report for PCT Application Serial No. PCT/US07/07631, mailed on Jun. 3, 2008.

Birznieks I, Jenmalm P, Goodwin AW, Johansson RS. "Encoding of direction of fingertip forces by human tactile afferents," Journal of Neuroscience. 21:8222-8237, 2001.

Flanagan JR, Burstedt MKO, Johansson RS "Control of fingertip forces in multi-digit manipulation," Journal of Neurophysiology. 81:1706-1717, 1999.

Johansson RS, Birznieks I. "First spikes in ensembles of human tactile afferents code complex spatial fingertip events," Nature Neuroscience 7:170-177, 2004.

Johansson RS, Westling G. "Signals in tactile afferents from the fingers eliciting adaptive motor responses during precision grip," Experimental Brain Research. 66:141-154, 1987.

Beccai, L. Design and fabrication of a hybrid silicon three-axial force sensor for biomechanical applications Sensors and Actuators A: Physical. vol. A120, No. 2: 370-382. May 17, 2005.

Beebe, D. et al. A silicon force sensor for robotics and medicine. Sensors and Actuators A 50:55-65, 1995.

Bloor, D. et al. A metal-polymer composite with unusual properties. Journal of Physics D: Applied Physics, 38: 2851-2860, 2005.

Butterfass, J. et al. DLR-Hand II: Next generation of a dexterous robot hand. Proceedings of the IEEE International Conference on Robotics and Automation. pp. 109-114, 2001.

Cameron, T. et al. Micromodular implants to provide electrical stimulation of paralyzed muscles and limbs, IEEE Trans Biomed Eng 1997; 44: pp. 781-790.

Cole, K.J. et al. Friction at the digit-object interface scales the sensory-motor transformation for grip responses to pulling loads. Experimental Brain Research, 95: 523-532, 1993.

Dalmia, A. et al. Electrochemical behavior of gold electrodes modified with self-assembled monolayers with an acidic end group for selective detection of dopamine. Journal of Electrochemistry, 430: 205-214, 1997.

Falcon, C. Inside implantable Devices. Medical Design Technology, Oct. 2004. pp. 24-27.

Gordon, A. et al. Memory representation underlying motor commands used during manipulation of common and novel objects, Journal of Neurophysiology 69: 1789-1796, 1993.

Gudnason, G. et al. A chip for an implantable neural stimulator. Analog Integrated Circuits and Signal processing 22 (1999), pp. 81-89.

Gudnason, G. et al. A distributed transducer system for functional electrical stimulation. Proc. ICECS, Malta, vol. 1, (2001) pp. 397-400.

Helsel, M et al. An impedance tomographic tactile sensor. Sensor and Actuators. vol. 14, No. 1, pp. 93-98. 1988.

Hornik, K. et al. Multilayer feed forward networks are universal approximators. Neural Networks, 2(5):359-366, 1989.

International Search Report for PCT Application Serial No. PCT/US08/63985, mailed on Jan. 16, 2009.

Johansson, R.S. et al. Roles of glabrous skin receptors and sensorimotor memory in automatic control of precision grip when lifting rougher or more slippery objects. Experimental Brain Research. 56:550-564, 1984.

Johansson, R.S. et al. Somatosensory control of precision grip during unpredictable pulling loads. I Changes in load force amplitude, Experimental Brain Research 89: 181-191, 1992.

Johansson, R.S. et al. Somatosensory control of precision grip during unpredictable pulling loads. II Changes in load force rate, Experimental Brain Research 89: 192-203, 1992.

Kaliki, .RR. et al. The Effects of Training Set on Prediction of Elbow Trajectory from Shoulder Trajectory during Reaching to Targets. 28th Annual International conference IEEE Engineering in Medicine and Biological Society (EMBS), pp. 5483-5486.

Kenaley, G. et al. Electrorheological Fluid-Based Robotic Fingers with Tactile Sensing. Proceedings of IEEE International Conference on Robotics and Automation 1:132-136, 1989.

Lee, M.H. et al. Tactile sensing for mechatronics—a state of the art survey. Mechatronics 9:1-31 1999.

Lee, S.Y. An implantable wireless bidirectional communication microstimulator for neuromuscular stimulation. IEEE Transactions on circuits and systems, vol. 52, Dec. 2005, pp. 2526-2538.

Lee, Y.K. et al. Mechanical properties of calcium phosphate based dental filling and regeneration materials Journal of Oral Rehabilitation 30; 418-425, 2003.

Liu, W. et al. A Neuro-Stimulus Chip with Telemetry Unit for Retinal Prosthetic Device. IEEE Journal of Solid-State Circuits, vol. 35 Oct. 2000, pp. 1487-1497.

Loeb, G.E. et al. Design and fabrication of an experimental cochlear prosthesis. Med. & Biol. Engng. & Comput. 21:241-254, 1983.

Loeb, G.E. et al. Microminiature molding techniques for cochlear electrode arrays. J. Neurosci. Meth. 63:85:92, 1995.

Loeb, G. E. et al. The Motor Unit and Muscle Action. Principles of Neural Science, 4th Ed Mc Graw Hill 2000, Chapter 34, pp. 674-694.

Loeb. G. E. et al. BION Injectable Interfaces with Peripheral Nerves and Muscles. Neurosurgical Focus, vol. 20, May 2006, pp. 1-9.

Mei, T. et al. An integrated MEMS three-dimensional tactile sensor with large force range. Sensor and Actuators 80:155-162, 2000.

Merrill, D. et al. Electrical stimulation of excitable tissue: design of efficacious and safe protocols. Journal of Neuroscience Methods, 141: 171-198, 2005.

Mukaibo, Y. et al. Development of a texture sensor emulating the tissue structure and perceptual mechanism of human fingers. Proc. of the 2005 IEEE International Conference on Robotics and Automation, pp. 2576-2581, 2005.

Piela, B. et al. Capacitance of the gold electrode in 0.5 M sulfuric acid solution: AC impedance studies. Journal of Electrochemistry, 388: 69-79, 1994.

Russell et al. Sensing Surface Shape by Touch. Robotics and Automation, 1993. Proceedings., 1993 IEEE International Conference on. May 2-6, 1993, pp. 423-428 vol. 1.

Sachs, N.A. et al. Development of a BIONic Muscle Spindle for Prosthetic Proprioception. IEEE Trans. Biomedical Engineering, vol. 54, No. 6, Jun. 2007, pp. 1031-1041.

Sivard, A. et al. Challenges of in-body communications. Embedded Systems Europe, Mar. 2005, pp. 34-37.

Suaning, G.J. et al. CMOS Neurostimulation ASIC with 100 Channels, Scaleable Output and Bidirectional Radio-Frequency; Telemetry. IEEE Transactions on Biomedical Engineering, vol. 48, Feb. 2001, pp. 248-260.

Tan, W. et al. Feasibility of Prosthetic Posture Sensing Via Injectable Electronic Modules. IEEE Trans. Neural Systems & Rehab. Engineering, vol. 15, No. 2, Jun. 2007, pp. 295-309.

Vasarhelyi ,G. et al. Effects of the elastic cover on tactile sensor arrays. Sensors and Actuators 132:245-251, 2006.

Voyles, R. et al. Design of a modular tactile sensor and actuator based on an electrorheological gel. Proceedings of IEEE International Conference on Robotics and Automation 1:13-17, 1989.

Westling, G. et al. Responses in glabrous skin mechanoreceptors during precision grip in humans. Experimental Brain Research. 66:128-140, 1987.

Yamada, D. et al. Artificial Finger Skin having ridges and distributed tactile sensors used for grasp force control, Proc. IEEE/RSJ International Conference on Intelligent Robots and Systems, pp. 686-691, 2001.

Zou, Q. et al. Single- and Triaxis Piezoelectric-Bimorph Accelerometer. IEEE/ASME Journal of Microelectromechanical Systems, vol. 17, No. 1, Feb. 2008, pp. 45-57.

Dario P. et al. Ferroelectric Polymer Tactile Sensors with Anthropomorphic Features. Proceedings IEEE International Conference on Robotics and Automation, Washington DC, 1:332-340, 1984.

Howe R.D. et al. Sensing Skin Acceleration for Slip and Texture Perception. Proceedings IEEE International Conference on Robotics and Automation, Scotsdale, AZ, 1:145-150, 1989.

Howe R.D. et al. Dynamic Tactile Sensing: Perception of Fine Surface Features with Stress Rate Sensing. IEEE Transactions on Robotics and Automation, 9(2):140:151, 1993.

Johansson R.S. et al. Responses of Mechanoreceptive Afferent Units in the Glabrous Skin of the Human Hand to Sinusoidal Skin Displacements. Brain Research, 244(1):17-25, 1982.

Johnson K.O. Neural mechanisms of tactual form and texture perception. Annual Review Neruroscience, 15:277-50, 1992.

Mountcastle V.B. et al. Detection Thresholds for Stimuli in Humans and Monkeys: Comparison with Threshold Events in Mechanoreceptive Afferent Nerve Fibers Innervating the Monkey Hand. Journal of Neurophysiology, 35:122-136, 1972.

Son J.S. et al. A Tactile Sensor for Localizing Transient Events in Manipulation. Proceedings of IEEE International Conference on Robotics and Automation, 1:471-476, 1994.

Westling G. et al. Factors Influencing the Force Control During Precision Grip. Experimental Brain Research, 53(2):277-84,1984.

Yamada Y. et al. Tactile Sensor with 3-Axis Force and Vibration Sensing Functions and its Application to Detect Rotational Slip. Proceedings IEEE International Conference on Robotics and Automation, San Diego, 4:3550-3557, 1994.

International Search Report for PCT Application Serial No. PCT/US09/39354, mailed on May 28, 2009.

International Search Report for PCT Application Serial No. PCT/US09/39357, mailed on May 29, 2009.

Brockett, R.W. Robotic Hands With Rheological Surfaces. Proceedings of the IEEE Conference on Robotics and Automaton, Philadelphia, PA, pp. 942-946 (1985).

Grupen R.A., et al. A Survey of General- Purpose Manipulation The International Journal of Robotics Research; 8; 38 (1989).

Howe, R.D. Tactile Sensing and Control of Robotic Manipulation. in Journal of Advanced Robotics, vol. 8, No. 3, pp. 1-30 (1994).

Hristu, D. et al. The performance of a deformable membrane tactile sensor: basic results on geometrically-defined tasks. Proc of the IEEE International Conference on Robotics & Automation San Francisco, California (2000).

Melchiorri, C. Tactile Sensing for Robotic Manipulation. in Ramsete: Lecture Notes in Control and Information Sciences vol. 270, pp. 75-102, Springer Berlin (2001).

Russell, R. A. A Tactile Sensor Skin for Measuring Surface Contours. in: Proc. IEEE Region 10 Int. Conf. on Technology Enabling Tomorrow: Computers, Communications and Automation towards the 21st Century, Melbourne, pp. 262-266 (1992).

Shimojo, M. et al. A Tactile Sensor Sheet Using Pressure Conductive Rubber With Electrical-Wires Stitched Method. IEEE Sensor Journal, vol. 4, No. 5, pp. 589-596, (2004).

* cited by examiner

FIG. 3
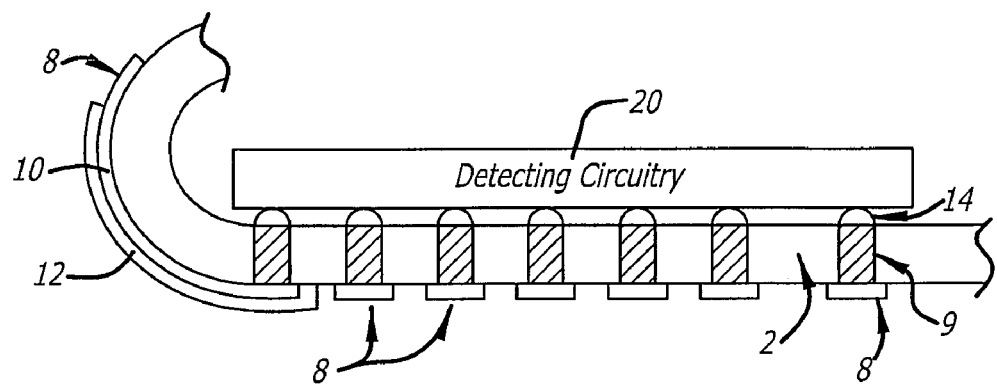
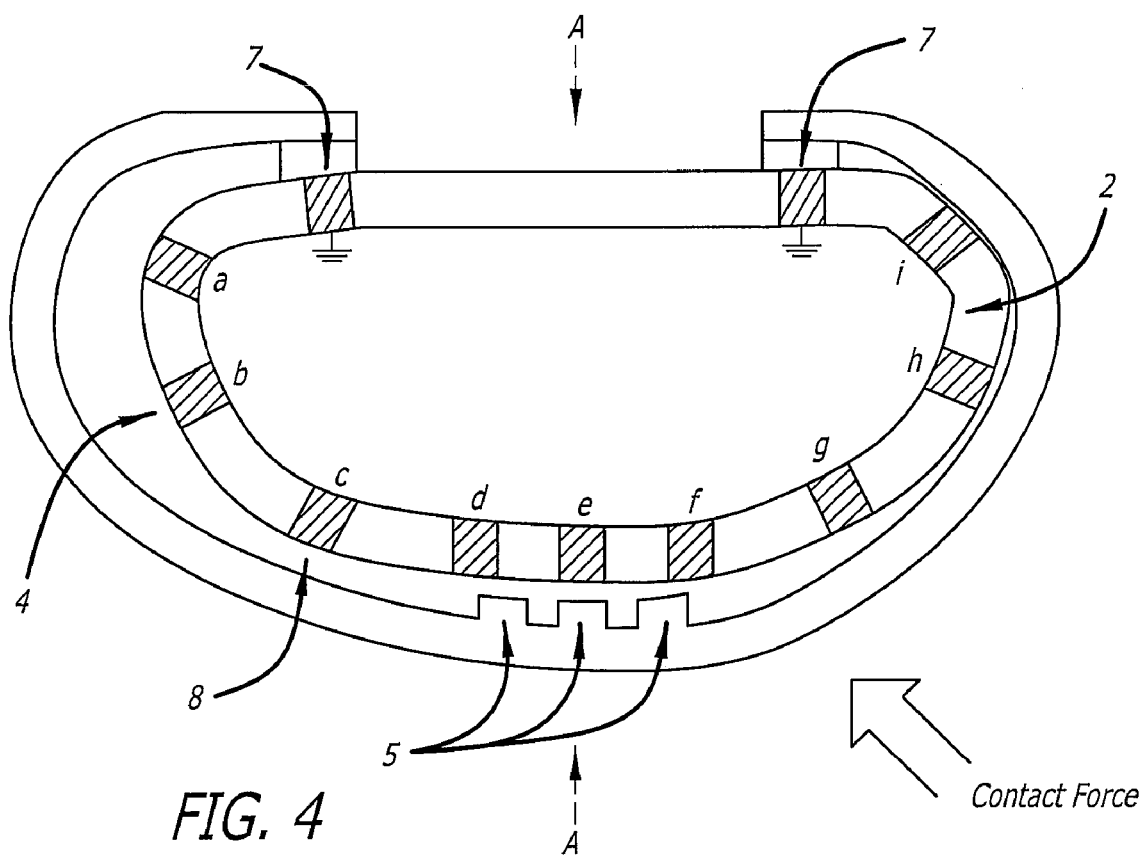
FIG. 4

BIOMIMETIC TACTILE SENSOR

CROSS REFERENCE TO RELATED APPLICATIONS

This patent application the claims the benefit of the filing date of U.S. provisional application Ser. No. 60/786,607, filed Mar. 28, 2006, entitled "Biomimetic Tactile Sensor" the contents of which are incorporated herein by reference.

BACKGROUND OF THE INVENTION

1. Field of the Invention

This application relates generally to devices and methods to provide a set of sensory feedback information capabilities from robotic or prosthetic finger tips comparable to those provided by the human skin.

2. General Background and State of the Art

Present generations of robots lack most of the sensorial abilities of humans. This limitation prevents industrial robots from being used to carry on delicate tasks of enormous practical relevance (such as assembly operations) and, even more, it prevents the development of evoluted robots for off-factory jobs (agriculture, home, assistance to the disabled, etc). Future generations of robots may be increasingly featured by the massive use of dedicated sensors that will enhance substantially the limited ability of present robots to interact with the external world. Taction, vision and proximity are the sensory needs that, in combination or alone, are commonly accepted as desirable features of robots. Research on visual pattern recognition received considerable attention in recent years. Tactile recognition (the ability to recognize objects by manipulation) is an inherently active process. Unlike visual sensors (passive and located remotely from the object), tactile sensors must be put in contact with the object to be recognized and, even more, such contact should be competently organized in order to extract the maximum degree of information from manipulative acts.

Humans who have suffered amputations of their hands and arms are generally provided with prosthetic limbs. Increasingly these prosthetics incorporate electromechanical actuators to operate articulations similar to biological joints, particularly to control the fingers to grasp and hold objects. Recent research has revealed how arrays of biological tactile receptors distributed throughout the soft tissues of the finger tip are used normally by the nervous system to provide rapid adjustments of grip force. Due to limitations in currently available tactile sensing technology discussed below, currently available prosthetic fingers provide little or no sensing capabilities and cannot make use of these highly effective biological control strategies.

Tactile sensors are generally known and can be grouped into a number of different categories depending upon their construction, the most common groups are piezoresistive, piezoelectric, capacitive and elastoresistive structures. The common feature of all of these devices is the transduction of local asperities (unevenness or a projection from a surface) into electrical signals. Tactile sensors are commonly used in the field of robotics and in particular with those robotic devices which pick up and place objects in accordance with programmed instructions; the so-called "pick and place" class of robot. Unfortunately, while it would be desirable for the above-listed groups of tactile sensors to respond in much the same way that the human finger does, many of them can provide only limited information about a contact with an object. This requires large numbers of separate structures or electrical characteristics that require extensive circuitry in order to obtain an output indicative of the surface which has been contacted. For robotics, the difficulties associated with their non-linear response mechanisms, their fragile structure, and the high cost of assembling many discrete components limits their use of the above groups in an industrial environment. There are difficulties with calibration, environmental survivability, and other factors which render them less than optimal for many applications in less restricted environments, particularly those associated with motor-actuated prosthetic hands and telerobotic systems intended to augment human performance.

SUMMARY

The present biomimetic tactile sensor may possess softness, elasticity and some mechanical resistance that mimics natural human skin. Furthermore, it may detect and discriminate various aspects of contact with external objects, including the direction and magnitude of force, the extent and shape of the object, and small movements associated with impending slip.

An exemplary embodiment comprises a device through which a set of information is generated concerning tactile interaction between a manipulator and an object to be manipulated and recognized. The tactile information may be generated either by robot or prosthetic finger tips. A key feature of the embodiment may be that it confers a very high sensitivity to incremental changes in the distribution of pressure.

The sensory device may have a biomimetic shape of the core and covering skin and pulp that results in distinctive and readily detectable patterns of impedance changes across an array of electrodes disposed on the core, to take advantage of the various distortions of the pulp produced by the contact parameters to be detected and discriminated. Because of the overall biomimetic design of the sensor assembly, the stimulus features that may be most readily detected by the feature extraction circuitry are those features that may be most useful for automatic adjustment of contact force to achieve and maintain stable and efficient grasp of an object. Features of disclosed sensory devices that may be associated with this strategy include the complex mechanical contours of the core, the elasticity and points of attachment of the investing skin, the specific shapes and dispositions of the electrodes on the core surface, conditions of use in which at least some electrodes are nearly or completely occluded by direct contact with the overlying skin, and the extraction of information from complex temporospatial patterns of impedance changes among those electrodes using trainable algorithms such as neural networks.

Exemplary sensory devices may also include a sensor assembly whose basic form and function are similar to that of a human finger tip. A prosthetic hand or anthropomorphic robotic manipulandum could combine several such finger tips at the ends of appendages whose movements may be controlled by actuators. Similar padlike structures with sensors might also be deployed on grip contact surfaces akin to the palmar eminences over the heads of the metacarpal bones etc. One or more such sensor assemblies could be built with various sizes and shapes and mounted in varying numbers and positions on a variety of manipulanda, locomotor supports and other mechanical apparatus that must interact with external objects and surfaces according to information derived from contact sensors.

One embodiment of the present device may consist of a set of sensors that work by measuring the electrical impedance among a plurality of electrodes. The electrodes may be deployed on a substantially rigid core that is protected from direct contact with external objects by overlying deformable structures. A feature of this design may be the location of mechanically vulnerable connections between the electrodes and the signal processing circuitry, which are wholly contained within the substantially rigid core. A related feature may be that this design enables methods of manufacture and repair that are simple and efficient.

The plurality of sensors and their associated mechanical structures have similarities to the biological relationships among the cutaneous neural receptors, the distal phalanx, overlying finger pulp and covering skin and nail. Information may be extracted from such a plurality of sensors whereby such information can be related to canonical physical representations used to describe stimuli to be sensed, and/or used to control automatic adjustments of grip forces similar to the neural reflexes whereby humans maintain stable grip on complex objects.

It is understood that other embodiments of the biomimetic tactile sensor systems and methods will become readily apparent to those skilled in the art from the following detailed description, wherein it is shown and described only exemplary embodiments by way of illustration. As will be realized, the biomimetic tactile sensor systems and methods are capable of other and different embodiments and its several details are capable of modification in various other respects. Accordingly, the drawings and detailed description are to be regarded as illustrative in nature and not as restrictive.

BRIEF DESCRIPTION OF THE DRAWINGS

FIG. 3 shows a cross-sectional detail of a scheme for automated routing and connection of electrodes to electronic circuitry.

FIG. 4 shows a transverse cross-section of a tactile sensor responding to a typical contact force.

DETAILED DESCRIPTION

Figure 1:
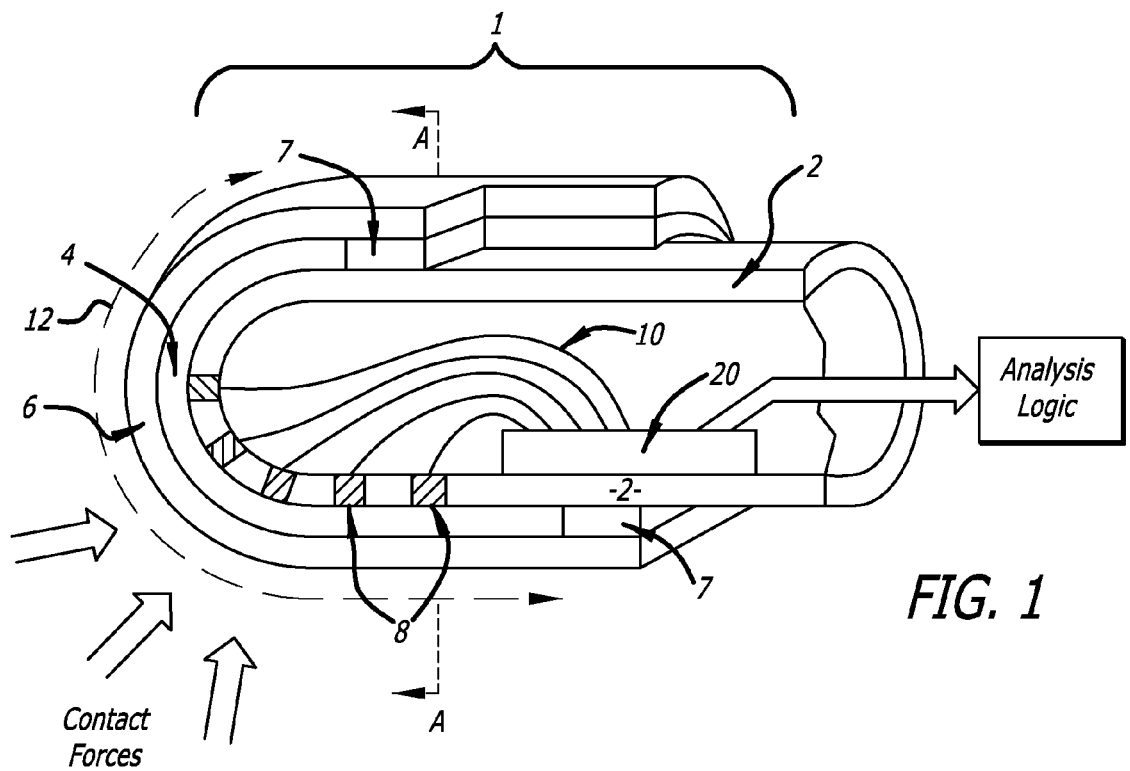
FIG. 1 shows a longitudinal cross-section of a tactile sensor in the form of a finger pad.

The detailed description set forth below is intended as a description of exemplary embodiments of the tactile sensory system and method and is not intended to represent the only embodiments in which the biomimetic tactile sensor systems and methods can be practiced. The term "exemplary" used throughout this description means "serving as an example, instance, or illustration," and should not necessarily be construed as preferred or advantageous over other embodiments. The detailed description includes specific details for the purpose of providing a thorough understanding of the tactile sensory systems and methods. However, it will be apparent to those skilled in the art that the tactile sensory systems and methods may be practiced without these specific details. In some instances, well-known structures and devices are shown in block diagram form in order to avoid obscuring the concepts of the tactile sensory systems and methods.

It is a general property of biological sensory receptors that they are highly evolved structures in which the receptors themselves and the tissues in which they are located may contain many features designed to enhance their sensitivity and the quantity of information that they can provide to the central nervous system. The skin contains multiple types of mechanoreceptors to transduce a variety of mechanical events that occur during contact with physical objects. These receptors are concentrated in sites such as the finger tips, where their sensitivity is enhanced by the mechanical properties of the skin, underlying pulp and bone, and adjacent fingernails. U.S. Pat. No. 4,980,646, to Zemel, is incorporated herein by reference and teaches a tactile sensor based on changes in the local electrical resistance presented by a layer of weakly conductive fluid whose shape is deformed by external forces applied to a deformable membrane. Zemel describes the application of a voltage gradient across the entire extent of the fluid by means of electrodes arranged on either side of the array of sensing strips, and the measurement of the local strength of that gradient by differential voltage measurements between adjacent pairs of electrode strips. U.S. Pat. No. 4,555,953 to Dario et al., which is incorporated by reference in its entirety, teaches different techniques and materials that have been utilized for the construction of artificial skin-like sensors.

The input-output properties of these biological transducers differ generally from engineered transducers. Engineered transducers are usually designed to produce a linear response to a single mechanical variable such as normal or tangential force at a single point. The signals from arrays of such transducers can be combined according to simple, analytical algorithms to extract orthogonal physical parameters of touch such as total force, center of force, directional force vector and two-point resolution. Biological touch receptors are highly nonlinear and nonorthogonal. Their signals are combined by adaptive neural networks to provide subconscious adjustment of motor output as well as high level conscious perception associated with haptic identification of objects. Neurophysiologists and psychologists often correlate the activity of somatosensory receptors and design measures of psychophysical percepts according to canonical physical parameters, but there is little evidence that the nervous system actually extracts direct representations of such parameters as an intermediate stage between sensation and performance. In fact, information theory suggests that such an intermediate representation would add noise and reduce information content, which would place such a strategy at an evolutionary disadvantage. Engineered sensors and their signal processing systems use linear, orthogonal representations because the downstream control systems generally have been based on such inputs. This strategy may work well for engineered systems such as industrial robots that must perform accurately for highly constrained and predictable tasks. It is difficult to apply to anthropomorphic robots and prosthetic limbs that must perform a broad and unpredictable range of tasks associated with activities of daily living. The problem may further be complicated by environmental factors in such environments (e.g. temperature, moisture, sharp edges etc.), which tend to damage or bias sensitive and/or physically exposed transducers.

Exemplary embodiments of the present sensory devices have features comparable to features found in biological systems. In particular, they may use biomimetic mechanical structures similar to those found in the finger tip to endow a set of simple, robust electronic sensors with a wide range of modalities and sensitivities similar to those found in biological mechanoreceptors. An exemplary embodiment may employ a larger number of small, local electrodes deployed in a curved array whose shape and mechanical properties mimic those of a biological finger tip. Each sensing electrode may be energized to provide an independent measure of the local mechanical deformations of the overlying membrane based on its impedance with respect to a remote common electrode. Further improvements are described to enhance the sensitivity and dynamic range of each sensing electrode by contouring the inner surface of the overlying membrane. Yet another exemplary embodiment teaches a novel method of detecting deformation of the membrane by energizing the membrane and detecting the capacitive coupling to each sensing electrode through a dielectric fluid or gas. In further embodiments, neural networks may compute directly the actuator adjustments required to maintain stable grip of objects with a variety of shapes and force vectors in a manner similar to that employed by neural control of the human hand.

Various aspect of the present exemplary biomimetic sensing devices can incorporate features described in the following articles, which are all incorporated herein by reference: Johansson R S, Westling G. ("Signals in tactile afferents from the fingers eliciting adaptive motor responses during precision grip", Experimental Brain Research. 66:141-154, 1987); Westling G, Johansson R S. "Responses in glabrous skin mechanoreceptorsd during precision grip in humans", Experimental Brain Research. 66:128-140, 1987); Flanagan J R, Burstedt M K O, Johansson R S "Control of fingertip forces in multi-digit manipulation" Journal of Neurophysiology. 81:1706-1717, 1999); Birznieks I, Jenmalm P, Goodwin A W, Johansson R S. "Encoding of direction of fingertip forces by human tactile afferents" Journal of Neuroscience. 21:8222-8237, 2001); Johansson R S, Birznieks "First spikes in ensembles of human tactile afferents code complex spatial fingertip events" Nature Neuroscience 7:170-177, 2004) which are all incorporated by reference in their entirety.

Mechanical Platform

Referring to FIG. 1, the sensor assembly 1 may consist of a substantially rigid central core 2 surrounded by a pulp 4 with fluid, elastic or gel mechanical properties, covered by a skin 6 attached to the core 2 by means of a seal 7 along the perimeter of the pad 12 thereby created. A plurality of electrodes 8 may be deployed on those surfaces of the core 2 whose contact with objects and surfaces is to be sensed, as described below. U.S. Pat. No. 4,980,646 to Zemel discusses an alternative tactile sensor design which may be implemented in embodiments of the present tactile sensors.

The skin 6 may be a deformable and/or elastic material similar to human glabrous skin in its mechanical properties and possessing advantageous properties such as toughness to resist wear, texture and tackiness to improve grip, and colorizable for cosmesis. As described below, it may be advantageous to incorporate bumps, ridges and/or other features into the internal and/or external surface(s) of the skin. Suitable materials may include but are not limited to polymers such as silicone elastomers and polyurethanes, among many others familiar to biomedical engineers and prosthetists. In a preferred embodiment, the core 2 may be made of a mechanically tough material such as zirconia ceramic or titanium metal that can function as part of the mechanical linkage of the prosthesis or robot on which the sensor assembly is deployed. The following references, which are incorporated by reference in their entirety, teach various features that may be utilized in the present tactile sensor devices and methods: U.S. Pat. No. 6,871,395 to Scher et al. teaches connecting electrically conductive elastomer to electronics and U.S. Pat. No. 6,529,122 to Magnussen et al. teaches measuring contact resistance between workpieces, U.S. Pat. No. 5,905,430 to Yoshino et al. for detecting state of contact between a contact member and a workpiece, U.S. Pat. No. 5,033,291 to Podoloff et al. for flexible tactile sensor for measuring foot pressure distributions; U.S. Pat. No. 5,014,224 to Hans for determining location and amount of exerted pressure; U.S. Pat. No. 4,817,440 to Curtin for identifying contact force and the contact pattern; U.S. Pat. No. 4,526,043 to Boie et al. for Conformable tactile sensor; and U.S. Pat. No. 4,481,815 to Overton for determining a parameter of an object being contacted by the tactile sensor.

In one exemplary embodiment, the choice of material for the pulp 4 may be chosen to be a deformable, volume-conductive liquid or gel whose electrical conductivity is sufficiently low that the resistance measured between two or more electrodes in contact with the pulp changes when the pulp is mechanically deformed. Suitable materials may include aqueous and nonaqueous gels with ionic conductors, liquid crystal materials, and many others that would be obvious to one normally skilled in the art. Advantageously, the pulp 4 can be injected through a hypodermic needle into the space between the skin 6 and the core 2 and its electrodes 8 after the skin 6 is attached to the seal 7. This makes it possible to control accurately the thickness and pressure of the pulp 4 and to refurbish the sensor assembly 1 by replacing the skin 6 and/or pulp 4 without affecting the electrodes 8 or detection circuitry 20.

Sensing Elements

Figure 2:
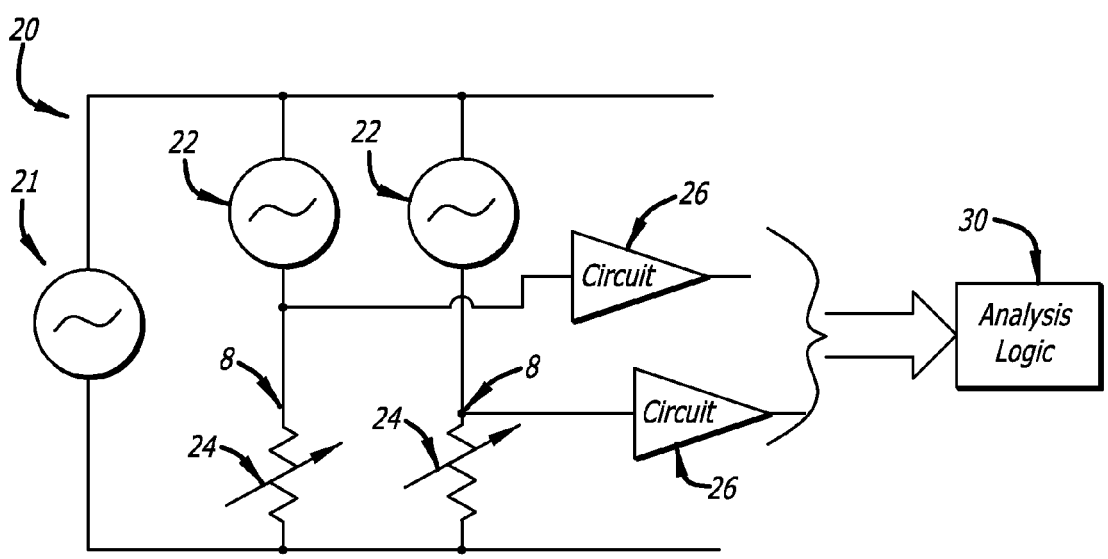
FIG. 2 shows a schematic of the electronic system for signal detection and processing.

Sensing may be accomplished by measuring changes in the electrical impedance among electrodes 8 whose distribution and location on the contoured surface of the core 2 may be a key factor in the sensing properties of the sensor assembly 1. One embodiment of detection circuitry 20 is illustrated schematically in FIG. 2 and described in more detail below. The electrical impedance 24 so measured can be dominated by the thickness and electrical properties of the pulp 4. For some of the various configurations described in more detail below, this may be a resistance that can be measured between a given electrode 8 and other electrodes or reference points and that depends generally on the inverse of the distance between said electrode 8 and the skin 6 immediately overlying said electrode 8. This distance may decrease because of pressure on the overlying skin but increases because of hydrostatic pressure in the viscoelastic pulp 4. If the skin 6 completely occludes an electrode 8, the electrical impedance 24 may become very large and insensitive to further increases in contact force, which may be undesirable. This problem can be mitigated by texturing the inner surface of skin 6. Such texture may be created if skin 6 is formed by the method of dip-coating and polymerization in situ as described below, in which case the surfaces of core 2 and electrodes 8 can be abraded prior to dip-coating to create the desired textured surface.

The sensing assembly 1 may have the greatest sensitivity to a small change in the distribution of pressure in those electrodes that are near the edge of a population of electrodes 8 in which the skin 6 has been compressed against the central electrodes of the population. Such a change may cause electrodes along this edge to change between the states of having a small distance between skin and electrode to having a zero distance, for which the resistance theoretically becomes infinite. Other embodiments are described below in which the impedance measured at an electrode 8 decreases as the distance between the electrode 8 and the skin 6 decreases.

Each electrode 8 may be electrically insulated from the others and from the overlying pulp 4 except for a specifically defined contact area with the pulp comprising the electrode 8. Each electrode 8 may be connected to detection circuitry 20 by means of a lead 10. This can be accomplished by various feedthroughs and coatings such as are commonly employed in hybrid microelectronic circuits and hermetic packages. FIG. 1 illustrates one embodiment in which the core 2 may be a dielectric material such as zirconia or alumina ceramic and the electrodes 8 consist of metallic vias that pass through laser-drilled holes in the ceramic and are connected to detection circuitry 20 by means of leads 10 consisting of conventional wirebonds. In another embodiment illustrated in FIG. 3, conductive lines may be printed on the outside and/or inside surface of the core 2 providing a means for forming the leads 10 so that the detection circuitry 20 can be connected to the plurality of electrodes 8 by means of a plurality of welds 14 made directly and simultaneously to the backs of conductive feedthrough pins 9 using methods such as flip-chip and ball-grid array bonding, as is well-known in the art. In yet another embodiment, the core 2 may be a metallic material such as titanium, aluminum or stainless steel and the electrodes 8 consist of the external surfaces of metal feedthroughs that pass through holes drilled through the core 2. The electrodes 8 may be held in place by a seal made from a dielectric material such as a melted glass frit that can provide both electrical insulation between the electrodes 8 and a hermetic seal between the liquid component of the pulp 4 and the detection circuitry 20.

Electronic Signal Processing

Detection circuitry 20 may be mounted within a recess in the core 2 that provides mechanical support and protection. As illustrated schematically in FIG. 2, said detection circuitry 20 converts power supply 21 to an energization signal 22 that may be applied to various combinations of electrodes 8. The impedances 24 of the effective circuit between the electrodes 8 through the pulp 4 may be quantified by measurement circuits 26 and reported to analysis logic 30. If the pulp is an electron conductor, then the energization signal 22 can be a direct current or voltage; the measured value may be a direct voltage or current, respectively. The impedance 24 of the volume conductive path through the pulp 4 may be dominated by its resistive component, which can be computed from Ohm's law. If the pulp 4 may be an ionic conductor such as an aqueous solution or gel, then the energization signal 22 may advantageously be an alternating current or voltage that avoids electrolysis and polarization effects on the electrodes 8. The magnitude of the measured alternating voltage or current can be extracted by rectifying and low pass filtering to compute the impedance 24 of the volume conductive path according to Ohm's law.

One alternative mode of operation of the sensor assembly 1 may be to detect small changes in the distribution of pressure, which as noted above that may tend to produce the greatest incremental change in impedances 24 among the subpopulation of electrodes 8 that are in or near contact with the overlying skin 6. The incremental sensitivity of the detection circuitry 20 to such changes may be different for the two modes of measurement just described. If the energization signal 22 is a voltage, then the measured current asymptotically approaches zero as the thickness of the overlying pulp decreases when it is compressed with increasing contact force. If the energization signal 22 is a current, then the measured voltage exponentially may rise toward the compliance voltage of the available power supply as the thickness of the overlying pulp is compressed towards the contact. These two relationships have implications for the detectability of incremental changes by the subsequent feature algorithms of the analysis logic 30 as described below. Any signal detection should cope with the inevitable consequences of electrical noise in the various electrically active and passive components such as are well-known to those normally skilled in the art.

One exemplary configuration for impedance measurement may be between each electrode 8 and a common contact (designated by the ground symbol in FIG. 2) that substantially surrounds all of the electrodes 8. The common contact may be printed photolithographically onto the surface of the core 2 if it is a dielectric material or formed by the core 2 itself if it is a conductive material. Alternatively, the common contact may be formed by conductive material incorporated into the seal 7 surrounding the electrodes 8 as depicted in FIG. 4. Many other configurations can be created dynamically by incorporating electronic switches into the detection circuitry 20. Among these configurations may be differential measurements between a pair of adjacent electrodes 8, measurements between one electrode 8 and all other electrodes connected together by said switches, and differential measurements between various combinations of electrodes 8 selected dynamically by means of said switches.

In yet another exemplary embodiment, the pulp 4 can be a volume conductor with a fairly high resistivity such as 100 (ohm)(cm) and the skin 6 can be a conductor that is connected to the "ground" or reference voltage of the detection circuitry. In this case, the electrical impedance 24 between each electrode 8 and the skin 6 may be approximately proportional to the distance between them, declining rapidly to approximately zero as they actually touch each other. Still other combinations of conductive and dielectric materials for the pulp 4 and skin 6 and related detection circuitry 20 are included within the scope of the system.

In an alternate embodiment, the pulp 4 can be made from a dielectric material and the skin 6 can be an electrical conductor such as a woven metal fabric or metal- or carbon-filled polymer. Suitable dielectric materials for the pulp 4 may include but are not limited to gases such as air, liquids such as mineral oil, and gels such as silicone polymers. In this embodiment, the impedance 24 between each electrode 8 and the overlying skin 6 may be essentially that of a capacitor whose value increases with the inverse of the distance between the electrode 8 and the overlying skin 6. Thus, the mechanical factors in the design and performance of the sensor assembly 1 may be generally similar to those of the first embodiment in which the pulp 4 is a conductor and the skin 6 is a dielectric. The impedance of a capacitor is related inversely to the value of its capacitance and inversely to the frequency of the electrical signal applied to it. In this alternate embodiment, the impedance between any one or more electrodes 8 and the skin 6 may be readily measured by applying an energization signal 22 between them that may be an alternating current or voltage and measuring the alternating voltage or current, respectively. It may generally be advantageous for the skin 6 to be connected to the "ground" or reference voltage for all of the individual detection circuits 20 associated with the various electrodes 8.

In the above alternate embodiment, if such a conductive skin 6 actually touches an electrode 8, the impedance 24 between them may go abruptly to approximately zero because of ohmic conductance between them. If that is not desired, such contact can be prevented and the maximal value of the capacitance between them can be stabilized by coating the inside surface of the conductive skin with a thin and flexible dielectric layer such as poly-paraxylylene (commercial tradename Parylene). If the skin 6 is composed of a woven metal fabric, a vapor-deposited coating of Parylene on both the inside and outside surface of the skin 6 can advantageously be used to seal the fabric so that the dielectric material used for the pulp 4 does not leak out and to avoid making electrical contact with external objects.

Figure 5:
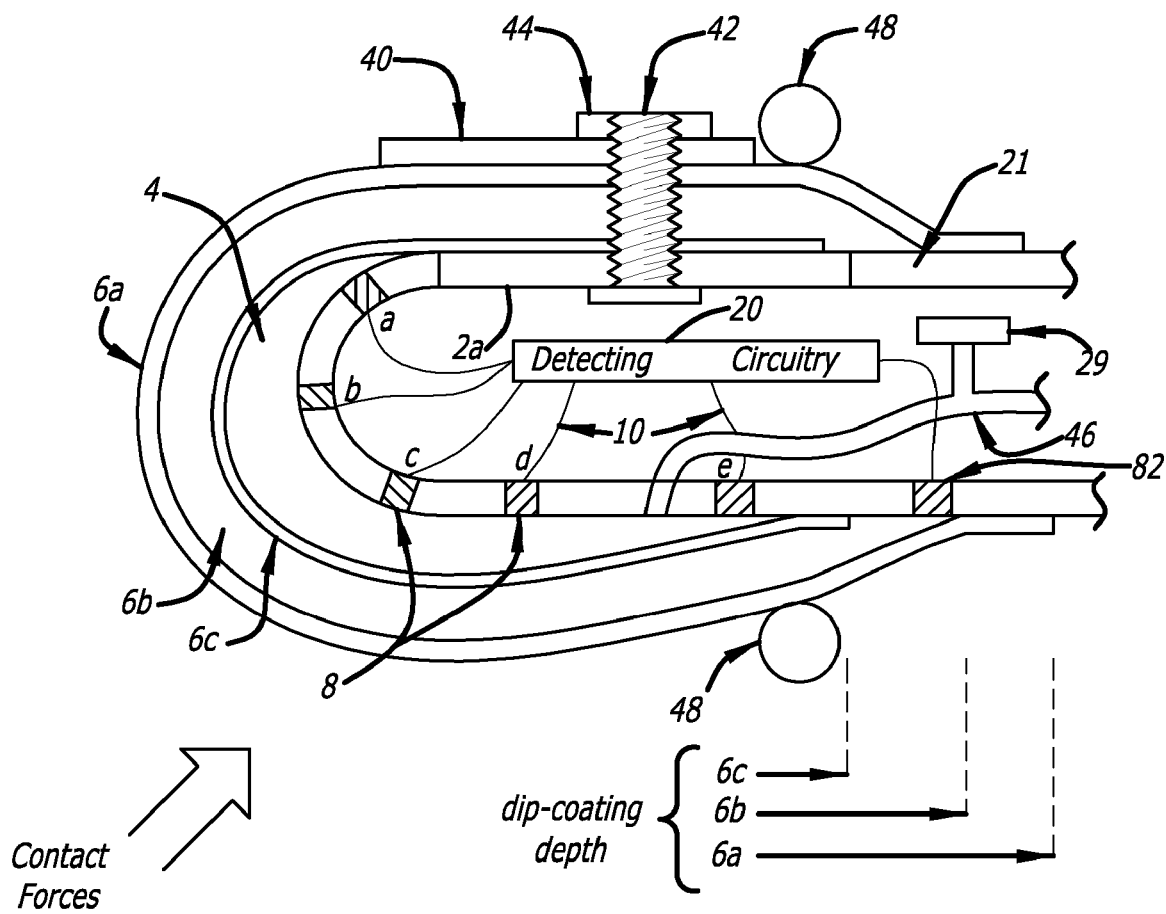
FIG. 5 shows a longitudinal cross-section of a tactile sensor in the form of a finger pad and which employs variable-capacitance sensing.
Figure 6:
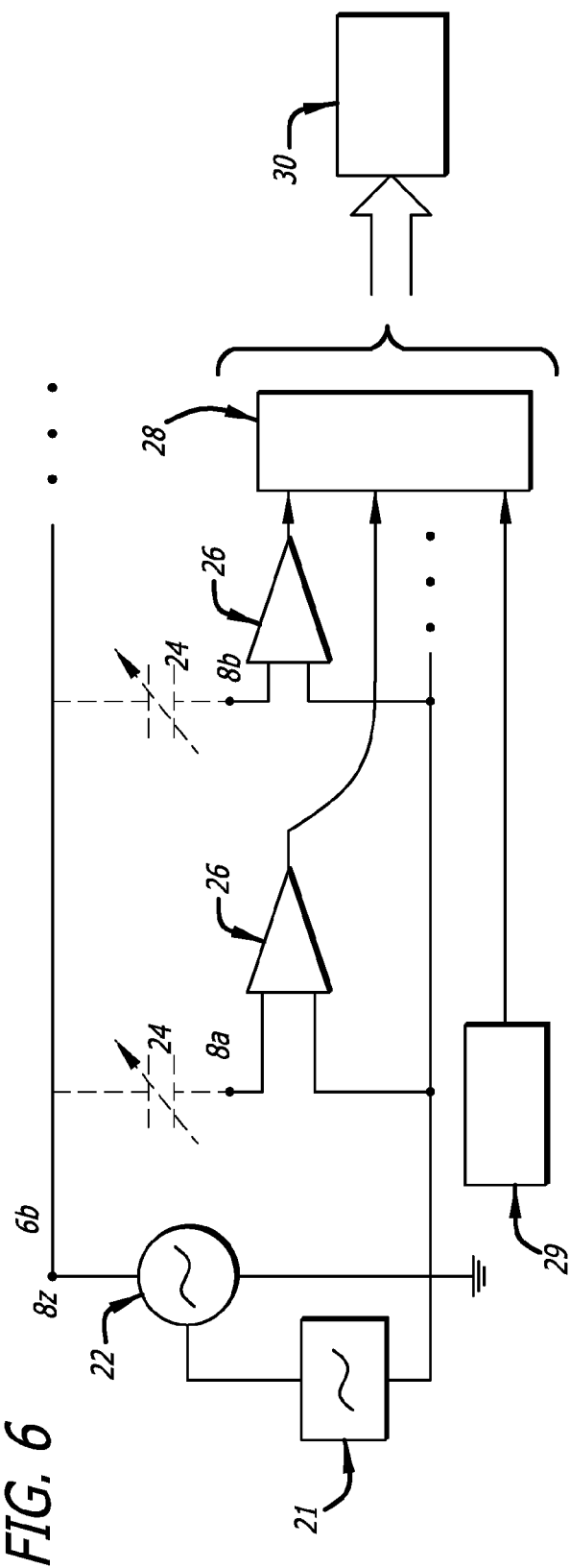
FIG. 6 shows a schematic of the electronic system for signal detection for a tactile sensor array that employs variable-capacitance sensing.

Yet another exemplary embodiment in which the deformation of the skin 6 and pulp 4 may be detected as variable capacitance as illustrated in FIGS. 5 and 6. FIG. 5 depicts a longitudinal cross-section of sensing assembly 1 in which the skin 6 may be composed of three layers: outer layer 6a may be made of a textured dielectric material suitable for cosmesis, 6b may be made of a conductive material such as a metal-filled polymer, and 6c may be a thin, inner layer made of a soft dielectric material such as some silicone elastomers. Said layers may be formed by successive dip-coating to staggered depths as illustrated, using core 2 as a mandrel. Conductive skin layer 6b may be dip-coated so as to make electrical contact with common electrode 8z, as depicted schematically in FIG. 6. Core 2 may be equipped with capillary tube 46 which is used to introduce pulp 4 under pressure to inflate skin 6 away from core 2. Optionally, fill tube 46 can be connected to pressure transducer 29, which may be useful particularly to detect small, high frequency fluctuations in pressure in pulp 4 such as might be caused by vibration arising from sliding the textured outer surface of skin 6a over textured objects. At its proximal edge, skin 6 may be retained by O-ring 48 against core 2 to prevent loss of pressurized material from pulp 4. Advantageously, core 2 may have a removable section 2a that provides access to install detection circuitry 20, leads 10 to the inner surfaces of electrodes 8 and 9, and such other components as may be desired. Optionally, removable section 2a of core 2 may be equipped with a tension member 42 by which finger nail 40 can be compressed against skin 6 by retaining member 44. This arrangement may provide improved cosmesis and contributes to the specialized sensitivity of electrodes such as electrode 8a which is near the edge of finger nail 40.

For use in the variable capacitance sensing assembly 1 illustrated in FIG. 5, detection circuitry 20 may be configured according to the electronic schematic illustrated in FIG. 6. Energization signal 22 may be an AC voltage that is applied to common electrode 8z and thus to conductive skin layer 6b. The capacitance between each sensing electrode 8a, b . . . and conductive skin layer 6b may constitute the electrical impedance 24 that changes as the thickness of the dielectric pulp 4 between these elements changes in response to contact forces. A small fraction of the voltage of the energization signal 22 may be detected on each of sensing electrodes 8a, b . . . by detection circuitry 20. The data from all sensing electrodes, pressure transducer, and other sensors that may be incorporated (e.g. temperature sensors) may be combined and serialized by multiplexor 28 and transmitted to analysis logic 30.

Feature Extraction

Figure 7:
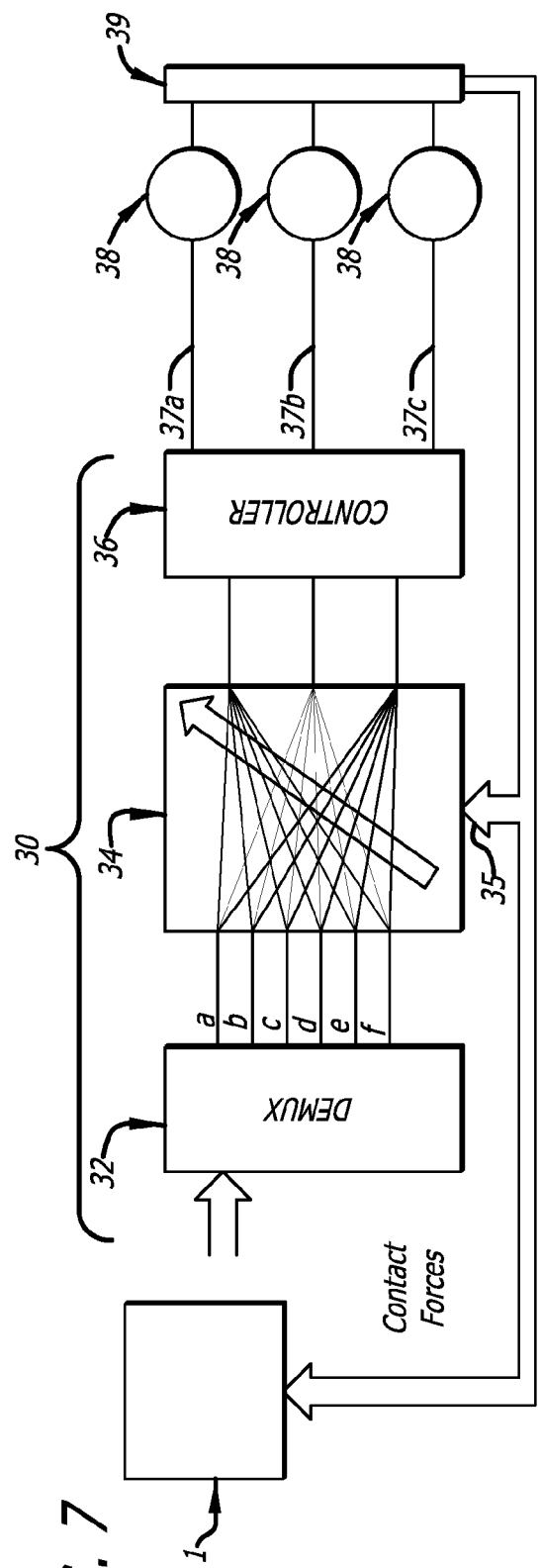
FIG. 7 shows a schematic of a neural network trained to adjust grip forces according to feedback from the tactile sensor.

The positioning of the electrodes 8 with respect to the contours of the core 2 and overlying pulp 4 and skin 6 may cause distinct patterns of change in the various impedances 24 measured by the detection circuitry 20 as the sensor assembly 1 contacts various objects and surfaces with various force vectors. Analysis logic 30 may incorporate feature extraction algorithms to make inferences about the nature of the contact according to the patterns so detected. It may be useful to identify how different aspects of any particular stimulus parameter to be sensed will influence the array of electrodes comprising the sensor assembly 1. If such influences result in sufficiently distinct output patterns across all of the elements of the sensor, then it may be feasible to employ algorithms known as neural networks that may function similar to those embodied in the nervous system in order to identify the nature of the contact state in terms of feature of contacted objects and spatiotemporal distribution of contact forces. That is, neural networks can be trained by learning to respond in a useful manner to those features of any stimulus that must be discriminated. FIG. 7 illustrates a configuration in which the serialized sensor data from the sensor assembly 1 may be processed by analysis logic 30 consisting of an input demultiplexor 32 that provides data to the input layer of neural network 34. The output layer 36 may provide control signals 37a-c to actuators 38 that operate the articulations of the mechanical hand 39. Movements of the mechanical hand 39 may give rise to changes in the contact forces between the fingers and external objects to be gripped, which results in changing signals from the sensor assembly 1. The neural network 34 may consist of a matrix of connectivity between input and output signals embodied as gains in a hidden layer. The neural network 34 may be trained to produce the desired transformation between input and output signals by iteratively and systematically adjusting those gains according to training signal 35 derived from comparisons between the responses of the mechanical hand 39 and a dataset of observations of normal human hands manipulating similar objects under similar conditions.

The following is an exemplary list of stimulus features, their effects on the electrical impedances 24 may be measured among various electrodes 8, and associated feature extraction algorithms that can be incorporated or trained into said analysis logic 30. The examples are all described with reference to the first exemplary embodiment in which the pulp 4 may be a moderately resistive volume conductor and the skin 6 is a dielectric, but similar feature extraction algorithms can be applied to the temporospatial patterns of impedance that can be measured by the sensor assembly for the various alternate embodiments described above, as will be obvious to one normally skilled in the art. Most are illustrated with reference to FIG. 4, a cross-sectional view along axis A-A as denoted in FIG. 1, which represents only one of many such parallel cross-sections, each potentially containing a plurality of electrodes and related circuitry. The changes in electrical impedance 24 are discussed in the context of the first preferred embodiment presented in FIGS. 1-4 in which decreases in the distance between skin 6 and electrodes 8a, b, . . . may produce increases in electrical impedance 24. In other embodiments, changes in distance may give rise to different but detectable changes in electrical impedance 24, which can be related to stimulus features by variants of detection circuitry 20 and analysis logic 30 that would be obvious to one normally skilled in the art.

Contact Force

As the total force increases on central area of the sensor assembly 1, the pulp 4 may be squeezed laterally into the region near the seal 7 at the perimeter note increasing space between skin 6 and electrodes 8 at positions a and b. The pulp 4 overlying the electrodes 8 in the compressed central area of the sensor assembly 1 becomes thinner, causing the impedance measurements associated with those electrodes to become higher note decreased space between skin 6 and electrodes 8 at positions d, e and f. The sum of all such impedance increases is related to the total force of contact; that sum will be dominated by the nonlinear increase in impedance as electrodes approach the skin.

Centroid and Area of Force

The impedance increases associated with the contact force measurement above can be related to the position of the electrodes 8 in the array in order to estimate where the center of force is located on the surface of the sensor assembly and the radius of curvature of the contacting object. For example, a sharp object might produce a local deformation of the skin that would cause large changes of impedance for only one or a few electrodes close to the point of contact. If the pulp 4 is an incompressible material, any decrease in its thickness over one or more electrodes 8 may be accompanied by a bulging increase in its thickness over other electrodes 8 at a distance from the region of contact.

Eccentricity of Force

If the contacting object is not radially symmetrical, the distribution of impedance changes detected by the electrodes will be similarly asymmetrical. This asymmetry can be detected to make inferences about the shape of the contacting object.

Vector of Force

In most object-manipulation tasks, the force between the sensor assembly 1 and the contacted object may not be oriented normal to the surface of the sensor assembly 1. In biological skin, shear force components change the stress and strain distributions within the fingertip that are sensed by receptors located within dermal and subdermal tissues but also by the distribution of pressure around the perimeter of the finger pad, particularly where the skin is anchored by the nail bed. This is described in the above-referenced and incorporated journal article (Birznieks, Jenmalm, Goodwin & Johansson 2001).

In an exemplary embodiment, those electrodes 8 located on the most convex portions of the core 2 near the seals 7 of the skin 6 may detect large increases in impedance when shear forces are directed away from them (see electrodes at positions h and i in FIG. 4). Such force may cause the skin 6 to slide, compressing the pulp 4 over these electrodes. A deviation of the force vector from normal may generally be associated with a tendency of the grasped object to slip or rotate unless that deviation met by increased normal forces or is opposed by the net deviations at other points of contact with the object, as described in the above-referenced journal articles (Flanagan, Burstedt & Johansson 1999; Johansson & Westling 1984).

Vernier Detection of Force Shifts

The detection of imminent slip is essential to the maintenance of efficient and effective grip on objects, in which it may be generally desirable to produce only the minimal force on the object required to initiate and maintain stable grasp. In the biological fingertip, imminent slip is detected by localized, tiny shifts in the distribution of shear forces in the skin. The relationship between electrode impedance and thickness of the overlying pulp may be inherently highly nonlinear, as described above. For example, if the inner surface of the nonconductive, elastomeric skin actually touches and covers an electrode, its impedance with respect to any other contact may increase abruptly towards infinity. By incorporating protruding textural elements 5 such as bumps and ridges onto the inner surface of an elastomeric skin 6, the distribution of impedances across the array of electrodes may undergo large changes when the skin is compressed against the core. In FIG. 4, the impedance 24 of the electrode 8 at position e would be highest because one textural element 5 is sized and positioned so as to completely cover it, while somewhat lower but nearly equal impedances would be measured for electrodes at positions d and f, which are incompletely covered by adjacent textural elements 5. Even a small lateral shift or stretch of skin 6 would reposition the three textural elements 5 with respect to all three electrodes, producing a large and readily detectable change in the pattern of impedances measured. In an exemplary embodiment, the system may be configured to detect the onset of any change in the shear force distribution, rather than the actual shear forces or the direction of the change. The appropriate response to the imminent slip implied by any such change is an increase in the grip force applied to the object as described in the above-referenced journal article (Johansson & Westling 1987).

Contact Transients and Vibration

Biological skin contains specialized Pacinian receptors that are highly sensitive to the acceleration component of skin deformation, making them useful to detect transient mechanical events that occur when making and breaking contact between a held object such as a tool and another object, and vibration of skin induced by the motion of skin ridges sliding over a textured object surface. The impedance of the electrodes in embodiments of the present system may undergo only very small changes when lightly loaded, but it may be possible to detect such changes by means of their synchronous phasing across the entire array of electrodes. Various signal averaging techniques to enhance the detection of the correlated component of weak and noisy signals from an array of sensors are well known in the prior art. Alternatively as depicted in FIGS. 5 and 6, the hydrostatic pressure in pulp 4 can be monitored by a conventional pressure transducer 29 connected to fill tube 46. The detection of transient mechanical events may be a key component in the automatic control of most object manipulations, which are organized around sequentially linked action phases delimited by discrete contact events that represent attainment of task subgoals. This is described in the above-referenced journal article (Westling & Johansson 1987). One commonly used signal processing technique to enhance the detection and timing of transient events in electrical signals may be the computation of temporal derivatives, which can be performed by analog circuits and digital signal processing algorithms that are well-known to electrical engineers. It is within the scope of our system to apply such techniques to the signals obtainable from the sensors described herein in order to enhance the utility of the tactile information so derived. Examples of the extraction and use of temporal cues by biological tactile systems can be found in the above-referenced journal article (Johansson & Birznieks 2004).

The previous description of the disclosed embodiments is provided to enable any person skilled in the art to make or use the tactile sensory systems and methods. Various modifications to these embodiments will be readily apparent to those skilled in the art, and the generic principles defined herein may be applied to other embodiments without departing from the spirit or scope of the tactile sensory systems and methods. Thus, the tactile sensory systems and methods are not intended to be limited to the embodiments shown herein but are to be accorded the widest scope consistent with the principles and novel features disclosed herein.

The invention claimed is:

1. A biomimetic tactile sensor for providing an electrical indication of contact comprising:

a substantially rigid inner core having an outer surface and a plurality of electrodes on and distributed across at least a portion of the outer surface;

a deformable layer surrounding the electrodes and at least a substantial portion of the substantially-rigid inner core, the deformable layer having an inner and an outer surface;

texturing on the inner surface of the deformable layer positioned substantially opposed to at least one of the electrodes on the outer surface of the substantially-rigid inner core;

a volume of deformable material enclosed between the core and the deformable layer inner surface made of a volume-conductive liquid; and a detection system configured to detect changes in the electrical resistance of the volume-conductive liquid between at least some of the electrodes on the outer surface of the substantially-rigid inner core caused by force exerted on the deformable layer outer surface, wherein the texturing is configured such that it causes the electrical resistance at the opposing electrode to continue to increase in response to continued increases in the contact force that is applied to the outer surface of the deformable layer after the contact force reaches a level that causes the deformable layer to come in contact with the opposing electrode.

2. The biomimetic tactile sensor of claim 1 wherein the deformable layer is formed by dip-coating.

3. The biomimetic tactile sensor of claim 1 wherein the deformable material is injected through a channel into the space between the inner surface of the deformable layer and the core.

4. The biomimetic tactile sensor of claim 1 further including a pressure transducer located within the core to monitor the pressure of the space occupied by the deformable material.

5. The biomimetic tactile sensor of claim 4 wherein the outer surface of the deformable layer is textured and wherein the pressure transducer is configured to detect small, high frequency fluctuations in the pressure caused by sliding the textured outer surface over a textured object.

6. A biomimetic tactile sensor comprising:

a substantially rigid inner core having an outer surface that is convexly curved;

a plurality of electrodes arranged in a two-dimensional array on least a portion of the outer surface of the substantially-rigid inner core, each dimension have at least two electrodes;

a deformable layer surrounding the electrodes and at least a substantial portion of the substantially-rigid inner core, the deformable layer having an inner and an outer surface;

a volume-conductive liquid enclosed between the inner surface of the deformable layer and at least a portion of the outer surface of the substantially-rigid inner core and in electrical contact with the electrodes; and detection circuitry coupled to the electrodes and configured to detect changes in the electrical impedance of the volume-conductive liquid between at least two of the electrodes within the two-dimensional array and to interpret such changes under certain circumstances as being indicative of a shear force that is applied to the deformable layer.

7. The biomimetic tactile sensor of claim 6 wherein the deformable layer is formed by dip-coating.

8. The biomimetic tactile sensor of claim 6 further including a pressure transducer located within the core to monitor the pressure of the space occupied by the volume-conductive liquid.

9. The biomimetic tactile sensor of claim 8 wherein the outer surface of the deformable layer is textured and wherein the pressure transducer is configured to detect small, high frequency fluctuations in the pressure caused by sliding the textured outer surface over a textured object.

10. The biomimetic tactile sensor of claim 9 wherein the detection circuitry is configured to detect the center of the force that is exerted on the outer surface of the deformable layer.

11. The biomimetic tactile sensor of claim 9 wherein the detection circuitry is configured to detect the radius of curvature in connection with contact between the outer surface of the deformable layer and an object.

12. The biomimetic tactile sensor of claim 6 wherein the volume-conductive liquid is injected through a channel into the space between the inner surface of the deformable layer and the core.

* * * * *